United States Patent
Musick et al.

(10) Patent No.: US 7,498,081 B2
(45) Date of Patent: Mar. 3, 2009

(54) CORE-SHELL COMPOSITE INORGANIC PIGMENTS AND METHOD OF PREPARATION FOR CRYSTALLIZABLE GLASS FRIT COMPOSITIONS

(75) Inventors: Michael D. Musick, Mason, OH (US); Hasan B. Emlemdi, Hamilton, OH (US)

(73) Assignee: Thw Shwphwed Color Company, Cincinnati, OH (US)

( * ) Notice: Subject to any disclaimer, the term of this patent is extended or adjusted under 35 U.S.C. 154(b) by 444 days.

(21) Appl. No.: 11/361,385

(22) Filed: Feb. 24, 2006

(65) Prior Publication Data

US 2006/0216513 A1 Sep. 28, 2006

Related U.S. Application Data

(60) Provisional application No. 60/658,510, filed on Mar. 2, 2005.

(51) Int. Cl.
*B32B 5/66* (2006.01)
(52) U.S. Cl. .................. 428/403; 428/404; 428/405; 428/406; 428/407
(58) Field of Classification Search .............. 428/403, 428/404, 405, 406, 407
See application file for complete search history.

(56) References Cited

U.S. PATENT DOCUMENTS

| | | | |
|---|---|---|---|
| 5,080,718 A | * | 1/1992 | Sullivan et al. ............ 106/453 |
| 5,153,150 A | | 10/1992 | Ruderer et al. |
| 5,228,910 A | * | 7/1993 | Joyce et al. ................. 106/450 |
| 6,022,624 A | | 2/2000 | Sakoske |
| 6,105,394 A | * | 8/2000 | Sridharan et al. ........... 65/33.6 |
| 6,623,555 B1 | | 9/2003 | Haverinen et al. |

OTHER PUBLICATIONS

Emlemdi, Hasan B.: Durable Functional Glass Enamel Coating for Automotive Applications. U.S. Appl. No. 60/649,203, filed Feb. 2, 2005.
Houmes, Joel D.: "Silicon Alloys Materials as Silver Migration Inhibitors." U.S. Appl. No. 60/663,780, filed Mar. 21, 2005.
Dry Color Manufacturers' Association: "Classification and Chemical Description of the Complex Inorganic Color Pigments." 3rd Edition (1991), pp. 9-35.

* cited by examiner

*Primary Examiner*—Leszek Kiliman
(74) *Attorney, Agent, or Firm*—Frost Brown Todd LLC

(57) ABSTRACT

Aqueous chemical routes and finished compositions of a core-shell particulate material for application in crystallizable glass enamel are disclosed. A composition of particles containing a shell of inorganic oxides or mixed-metal inorganic oxides and a core material of complex inorganic colored pigment, wherein the shell material is comprised of any single oxide or combination of oxides is taught. Preferred elements of composition for the shell are oxides and silicates of Ti, Ni, Zn, Al, Zr, Si, Sn, Bi, Na, K, and B. Core materials may be any material commonly classified as a complex inorganic colored pigment. The resulting particles function in glass enamel formulations as coloring agents and additives for partial crystallization of the glass material, and provide modification of glass melt temperature, durability, acid resistance, and other desirable properties.

16 Claims, No Drawings

CORE-SHELL COMPOSITE INORGANIC PIGMENTS AND METHOD OF PREPARATION FOR CRYSTALLIZABLE GLASS FRIT COMPOSITIONS

CROSS-REFERENCE TO RELATED APPLICATION

This application is related to and claims priority from U.S. Provisional Patent Application No. 60/658,510, Musick and Emlemdi, filed Mar. 2, 2005, incorporated herein by reference.

TECHNICAL FIELD

This patent relates to the field of colored enamels. Specifically, the invention relates to enamels used for coloring of glass and particularly when the steps of applying color to glass is followed by an additional forming, shaping, or molding step.

BACKGROUND OF THE INVENTION

Inorganic colored pigments are based upon crystalline materials comprised of oxides of mixed metals. The art is described in the published brochure of the Dry Color Manufacturer's Association (DCMA) of 1117 N. 19th St., Suite 100, Arlington, Va. 22209, (1991), entitled Classification and Chemical Descriptions of the Complex Inorganic Colored Pigments, see particularly pages 9 to 35.

The present invention relates to the manufacture and application of enamels for colored glass and modification of the properties of glass forming materials when used to color or modify a glass substrate. Specifically, the invention addresses incorporation of inorganic colored pigments with a shell of a second material that results in beneficial properties beyond color when the material is applied to a glass substrate.

It is known that incorporation of inorganic pigments into glass frit often results in an undesirable increase in the melting point of the glass frit and may alter the durability of the glass frit materials. It is also known in the art that small additions of specific metal oxide materials can alter the melt temperature, clarity, and durability of the finished glass frit. Also known for the purpose of inducing crystallization, is the addition to a lead-free metal oxide glass frit (40-80% by weight) of a small quantity of crystalline material composed of (0.05-15% by weight) zinc silicate, cadmium silicate, or bismuth silicate as disclosed in U.S. Pat. No. 5,153,150, Ruderer, et al., issued Oct. 6, 1992, and U.S. Pat. No. 6,022,624, Sakoske, issued Feb. 8, 2000. Finally, U.S. Pat. No. 6,623, 555, Haverinen, et al., issued Sep. 23, 2003, teaches a method of using a precipitation process to make a composite pigment of precipitated calcium carbonate and a silicon compound which is said to have excellent optical and mechanical properties.

All patents and literature references cited in this application are incorporated herein by reference.

Partial crystallization is favored for ceramic enamels applied to glass surfaces subject to press molding to induce curvature or shape to a softened sheet of glass. Such ceramic "glass" enamels may consist of several glass compositions that are readily available and are commercially utilized to make glass enamels. Those systems include but are not limited to Bismuth-Boro-Silicate, Zinc-Boro-Silicate, and the like. The enamel film is primarily used for color but may have other functional properties. A mold covered with a flexible refractory pad is used to press the sheet over a curved form. In order to successfully complete the process, the pad must release completely from the enameled surface. The release of the pad has been correlated to the degree of crystallinity present in the fired glass frit, but the relationship is not necessarily absolute. No correlation between the crystallinity of the enamel and the present invention has been previously documented.

SUMMARY OF THE INVENTION

This patent discloses the synthesis and application of a material comprising one or more inorganic pigments coated with an inorganic shell comprised of an additional layer of metal oxides.

The core comprises discrete inorganic pigment particles of homogenous particle distribution. The core material may be of any pigment class that provides a metal oxide surface for formation of the shell material. The core particle may range in size from about 0.05 μm to about 50 μm in diameter, but preferably is from about 0.3 μm to about 2.0 μm in diameter or similar. The core material may be raw stock or processed through numerous attrition and grind steps prior to or concurrently with the deposition of the shell.

A shell comprises an additional metal oxide(s) and completely encapsulates the core particle such that the particle surface chemically reflects that of the shell material. Deposition of the shell does not alter the homogenous distribution of the measured particle size distribution as determined by laser light scattering spectrometry. A shift in the measured mean particle size is realized; that shift correlates to the volume fraction of the material deposited. The shell is precipitated from an aqueous solution of the appropriate Ti, Ni, Al, Zr, Zn, Si, Sn, Bi, Na, K, Li, and/or B metal salts. Additional metal oxides may be deposited onto the core in a similar manner in subsequent deposition steps or a mixture of metal oxides may be co-deposited in a single deposition step. Deposition of the shell is controlled by slow precipitation of the metal species from the dissolved salt solution; however, other methods known in the art, such as sol-gel, may be used. Properties of the shell, such as shell thickness and density, may be altered by changing deposition rates, metal concentrations, ratios of core material to shell precursors, and by the addition of other stabilization aids.

The shell material is dried and cured at an elevated temperature dependent upon the materials of composition to induce crystallization and/or oxide formation and can be subjected to additional deagglomeration steps after calcination. Examples of such steps include jet-milling, pulverizing and other particle size reduction techniques known to the art.

Examples of shell materials include $Zn_2SiO_4$, $Bi_2SiO_5$, and $Ni_2SiO_4$, but may be from any elemental material whose water soluble salt is capable of transformation into an oxide upon precipitation. Also included are materials composed of an inorganic pigment core such as a copper chrome oxide spinel particle, and a shell of single metal oxides such as $SnO_2$, $ZnO$, and $SiO_x$ wherein x is any number commonly designated in the class of amorphous silicas. The shell material can comprise from about 0.5% to about 40% by weight of the total particle mass. Preferred compositions comprise from about 3% to about 18% by weight of the shell material.

The finished glass enamel contains from about 40% to about 80% by weight of at least one or more lead-free metal oxide glass frits that may contain the precursors to shell material. The core-shell material is used as a fraction of a composition of finished glass enamel containing from about 0.2% to about 35% by weight of solids, preferably a composition containing from about 2% to about 11% by weight solids. It may be mixed optionally with other organic vehicles.

DETAILED DESCRIPTION OF THE INVENTION

The present invention provides for the composition and method of synthesis for core-shell composite inorganic pigment particles in uses typical of glass enamels. These composites provide for a method to control the properties of the final film and melt without the need to use separate additions of $Zn_2SiO_4$ or similar crystalline materials into lead-free glass frit applications.

The core-shell composite particles of the present invention typically originate from distinct particles of inorganic pigments, but the composition of the core material is not narrowly critical and other materials that contain surface oxide groups or display surface affinity for the named core materials can also be used. Furthermore, encapsulation of the core material does not lead to a significantly broadened particle size distribution, merely a measured increase in the measured mean particle size.

Shell materials can be any material from a class that includes inorganic silicates, and single or multiple metal oxides of the elements Ti, Ni, Zn, Al, Zr, Si, Sn, Bi, Na, K, Li, and B (or mixtures thereof). The shell completely encapsulates the core material but may vary significantly in thickness and composition. Typical shell thicknesses range from about 10 nm to about 600 nm, more preferably from about 40 nm to about 300 nm. The compositions are from about 2% to about 30% by weight of the total sample mass.

Precipitation of the shell material is performed in an aqueous solution containing the core material and dissolved metal salts. However, performance of similar steps in organic solvents is not excluded. It is understood that precursors suitable for the liquid medium are solvated first in the medium. Choices for starting materials may include, but are not limited to, tin acetate, tin bromide, tin chloride, tin fluoride, titanium chloride, titanium bromide, titanium butoxide, titanium sulfate, titanium oxysulfate, nickel acetate, nickel bromide, nickel carbonate, nickel chloride, nickel nitrate, zinc acetate, zinc bromide, zinc chloride, zinc nitrate, zinc sulfate, aluminum ammonium sulfate, aluminum acetate, aluminum bromide, aluminum chloride, aluminum lactate, aluminum metaphosphate, zirconium acetate, zirconium carbonate, zirconium bromide, zirconium carbonate hydroxide, zirconium chloride, zirconium oxychloride, zirconium oxynitrate, zirconyl perchlorate, bismuth acetate, bismuth bromide, bismuth citrate, bismuth oxychloride, bismuth chloride, bismuth nitrate, bismuth oxynitrate, bismuth perchlorate, boric acid, sodium borate, silicic acid, sodium silicate, potassium silicate, colloidal silica, tetraethylorthosilicate, sodium chloride, sodium sulfate, sodium carbonate, sodium phosphate, potassium chloride, potassium sulfate, potassium carbonate, potassium phosphate, and related compounds, as well as mixtures thereof.

In practice, the core material is stirred into water at from about 0.5% to about 30 wt. % concentration. The pH of the solution is adjusted, for example, with 3M NaOH, 3M $H_2SO_4$, phosphoric acid, or acetic acid to the appropriate pH. The pH is selected so as not to induce destabilization of the metal salt solution upon addition to the core-containing solution. The solution containing the dissolved metal salt(s) is added under agitation and allowed to equilibrate before the precipitation of the metal salt(s). Reactions that utilize colloidal silica are started identically. All reactions may or may not contain additional complexation aids and may be performed at elevated temperature to further induce precipitation and condensation of the shell onto the core particle. The precipitation reaction is controlled by a careful approach to the isoelectric point of the particle for deposition of colloidal particles or below the pH where instant precipitation of the metal oxide species occurs. Slow addition of the acid or base is accomplished by titrating in a small amount of acid or base at a known rate. Reaction may take from about 1 to about 12 hours given the concentration of the acid or base, the buffering power of the solution, the temperature of the reaction, and the rate of addition. The precipitated material preferentially deposits onto the core particles resulting in a homogenous shell of measurable thickness. The roughness and density of the shell material varies with composition.

For composite shells that require multiple materials to be deposited, simultaneous precipitations can be completed provided the precursor materials are stable at the same pH and deposit completely onto the core material avoiding the formation of new materials in the solution. This is the case for zirconium oxychloride and sodium silicate that both are soluble at pH 12 and, if adjusted slowly with 3M $H_2SO_4$ through pH=8, both deposit onto the core material. Cross-reaction and complex formation is permitted with the precursor materials provided the by-products deposit onto the core particle.

A second route to deposition of multiple materials uses two complete and distinct precipitation reactions. The materials need not be stable at the same pH but both must be insoluble at the end point of the reactions and one species has to be insoluble at the initial precipitation conditions of the second material. For example, a solution of nickel sulfate has been started at a pH=2 in acidified water. Nickel oxide complex is then precipitated by addition of a strong base. Base addition continues until a pH=11 is reached and sodium silicate precursor solution is added and allowed to equilibrate before addition of an acid solution to pH=8. The resulting core particle is coated with sequential layers of nickel oxide and silicate complex.

As noted above, the prerequisite for practice of the invention is the condition that the shell material completely encapsulates the core particle. This requirement does not extend to the addition of a second outer shell material. There is the possibility of simultaneous deposition of multiple materials onto the core that yields hybrid mixed-metal oxide shells. Another outcome is the formation of new hybrid soluble compound in the aqueous phase prior to deposition that yields materials containing entrained organic or inorganic materials. Likewise, the stoichiometry of the desired end product may not yield a molar ratio of core to shell components that result in a continuous or homogenous outer-shell, nor can the interpenetration of the shell material into the core material be discounted. For formation of the final crystalline or mixed-metal oxide coated product, little dependence on the order of deposition of precursor materials has been demonstrated.

To promote crystallization of the shell materials or condensation of any surface pendant hydroxyl groups to oxide, calcination of the coated core material may be required. The temperature and time is dependent upon the material of composition, but effective ranges are from about 300 to about 1000° C., with dwell times from about 30 to about 600 minutes.

Morphological inspection of the particles after calcination reveals shells of irregular thickness and roughness. This is primarily caused by the manner of deposition of the core materials. It is known that by regulation of the rate of deposition of materials density and morphology of the shell material can be altered. Some morphology is transferred from the core material. The core material may vary drastically in surface roughness, features, and shape reliant upon the particulate material and nature of processes applied prior to deposition of shell materials. The non-uniformity of the coating or irregular shape of the particle does not detract from the usefulness or fitness of the final product.

The following examples detail experimental methods used to synthesize the metal oxide or mixed-metal oxide coatings onto the pigment particles. The methods were conducted in filtered deionized water under ambient pressure, atmosphere, and, unless noted, at 20 to 22° C. The examples are not intended to be limiting of the present invention.

X-ray fluorescence spectrometry is used to determine the elemental composition of the reaction products. The results are reported in Table 1. The measured elemental composition is consistent with the expected yield and deposition of the reaction starting materials. The results are representative of the materials produced within the present invention but are not intended to limit the scope of the invention.

EXAMPLE 1

Mix 150 g pigment with 1 L $H_2O$, adjust pH to 5 with 3M solution of glacial acetic acid. Dissolve 62.4 g of zinc sulfate into 150-ml $H_2O$. Add 120 ml of zinc solution to pigment slurry. Adjust pH to ~5.65 with 1M NaOH, and stir 24 hours. Add 3M NaOH until pH reaches 10.3. Add 45.3 g of sodium silicate (40 wt. % Si) to 150 ml $H_2O$. Pour 120 ml sodium silicate into slurry, lower pH of slurry back to 9.5 with 0.1M HCl, and stir 24 hours. Filter and oven dry at 105° C.

EXAMPLE 2

Dissolve 75 g zinc sulfate into 150 ml $H_2O$. Dilute 23.25 g LUDOX® TMA with 150 ml $H_2O$. LUDOX® TMA, sourced from W.R. Grace Company, is a solution of stabilized colloidal silica. Mix 150 g BK 376 with 1 L $H_2O$. BK376, a complex inorganic colored pigment containing Fe, Cr, and Mn, is produced by Shepherd Color Company. Adjust pH of pigment slurry to 5.3 and add zinc and LUDOX® solution simultaneously. Slowly add 0.2M NaOH until pH reaches 10. Stir 24 hours, filter and oven dry at 105° C. Fire at 1860° C. for 4 hours.

EXAMPLE 3

Dissolve 151.13 g of nickel carbonate in 500 ml $H_2O$. Dilute 45.3 g of sodium silicate (40 wt. % Si) to 150 ml with $H_2O$. Mix 150 g BK376 with 1 L $H_2O$ and adjust pH to 3 with 88% phosphoric acid solution. Add NaOH to pH equals 10.3. Add 120 ml sodium silicate solution to pigment slurry and lower pH with phosphoric acid until it reaches 9.5. Stir 24 hours, filter, and oven dry at 105° C. Fire at 1860° C. for 4 hours.

EXAMPLE 4

Dissolve 45.1 g of bismuth citrate in 150 ml $H_2O$, raise pH to 11 with 88% phosphoric acid solution. Dilute 45.3 g sodium silicate (40 wt. % Si) to 150 ml $H_2O$. Mix 150 g BK376 with 1 L $H_2O$ and adjust pH to 11 with 88% phosphoric acid solution. Simultaneously, add 120 ml bismuth citrate and 120 ml sodium silicate solutions to the slurry. Under constant agitation, lower pH of the solution to 9.5 by slow addition of HCl. Slowly lower pH to 5 with dropwise addition of 3M HCl. Stir 24 hours, filter and dry in oven at 105° C. Fire the material at 1860° C. for 4 hours.

EXAMPLE 5

Dissolve 45 g bismuth citrate into 150 ml $H_2O$. Add 3M KOH or 3M $NH_3OH$ to pH=11; mix for 20 minutes. Add 45.3 g sodium silicate to 150 ml $H_2O$. Mix 150 g BK376 inorganic pigment with 1 L $H_2O$ in a 2 L beaker. Adjust pH of the slurry to pH=11 with 3M KOH. Add simultaneously to stirred slurry 120 ml of bismuth citrate solution and 120 ml of sodium silicate solution. Mix at 600 rpm. Slowly adjust pH of slurry to pH=5 with 3M HCl at 0.5 ml/min. Stir 24 hours, filter, and dry in 105° C. oven overnight.

EXAMPLE 6

Add 200 g BK1GM, an copper chrome oxide spinel pigment produced by Shepherd Color Company, to 1500 ml $H_2O$. Mix with rapid agitation. Lower the pH of the slurry to 2.0 with 3M HCl. Add 30 g stannous chloride to 200 ml $H_2O$. The pH of the finished stannous chloride solution should equal 2.2. Add stannous chloride solution to slurry. Add 3M NaOH dropwise to slurry until pH reaches 3.2. Stir for 24 hours. Filter the solution, wash with $H_2O$, and dry in 105° C. oven.

TABLE I

Elemental compositional analysis of end products.*

| Element | Example 1 | 2 | 3 | 4 | 5 | 6 |
|---|---|---|---|---|---|---|
| Si | ~1.73 | ~2.17 | ~2.2 | ~3.20 | ~1.83 | |
| Cr | ~17.65 | ~16.97 | ~12 | ~16.63 | ~17.72 | ~45.78 |
| Mn | ~14.10 | ~13.63 | ~9.8 | ~12.93 | ~14.64 | |
| Fe | | ~12.36 | ~9.2 | ~11.58 | ~12.98 | |
| Ni | ~20.12 | ~19.49 | ~30 | ~17.69 | ~19.49 | |
| Cu | | | | | | ~25.32 |
| Zn | ~6.4 | ~9.08 | | | | |
| Bi | | | ~0.87 | ~11.66 | ~6.36 | |
| Sn | | | | | | ~0.83 |

*reported values are % (w/w)

The present invention is typically utilized in combination with an enamel system used to color, decorate, or functionalize glass in many industrial and commercial applications. These systems are recognizable to those skilled in the art and typically contain film-forming materials that after firing of the applied enamel at an elevated temperature result in adhesion of the enamel materials. A system may contain a glass flux, a liquid medium, and other liquids or powder additions. To the above system, the present invention is added to impart color, gloss, and alter other physical characteristics that aid in the processing of the enamel or final characteristics of the finished film.

The utility of the invention is demonstrated as follows. A small quantity of liquid enamel is produced containing examples of the present invention. The formulations are shown in Table II. Glass flux and example material are added to a liquid medium and passed through a three-roll mill to incorporate the materials. The viscosity is adjusted prior to application of the enamel to small, clean 2"×2" glass panels. Application is through a 160-mesh patterned screen to produce a 1.5"×1.5" square of enamel on the glass panel. Three panels are generated for each sample formulation from Table II. The glass panels are then fired for 6 minutes in an electric oven at the temperatures indicated in Table III (1180° F., 1200° F., and 1230° F.) The color, gloss, fit, optical density, and acid resistance of the resulting film are measured. A qualitative assessment of second surface color is also made.

The test set for each group of glass panels (3 panels per sample) is conducted according to standard laboratory practice and the results reported in Table III. With each of the test panels, a simple scratch test is used to determine if the enamel melted and fused with the glass. If the enamel fused with the glass surface, "F" is used to denote the condition. If the enamel did not fuse with the glass, "NF" is used to denote the condition. Color is recorded using a tri-stimulus instrument in CIE Lab units. The color of the second surface, (visual observation of film appearance through-glass) is qualitatively recorded as grey or black. Gloss or specular reflection is measured with a glossmeter at 45° and reported as standard values. Acid resistance is performed by masking an area of the test film with a cover glass and exposing to acid several drops of acid solution. The concentrations of the three acid test solutions are 10% by weight of citric acid, 0.1N of sulfuric acid, and 3.8% HCl. Results are judged after exposure and rinsing with water on a graduated scale from 1 to 7 in accordance with ASTM C724-91. A score of 1 indicates no change is apparent in the film after exposure and a score of 7 indicates complete removal of the films with intermediate conditions scored as whole numbers. Optical density is recorded with a transmission densitometer and reported in standard units.

The results of the performance testing are typical, but are not intended to be limiting of the invention. Characterization of fired enamel films containing example material 2 and material 4 (Samples A, B, and C) indicate that, compared to the control untreated material (Sample F), the present invention results in films that maintain a reduced gloss regardless of firing temperature and time. In contrast, the control material Sample F clearly exhibits an increasing gloss with increasing fire temperature. A similar trend is observed for example material 6. Gloss has been demonstrated in the art as a predictor of release properties of a press pad. A gloss of less than 10 may indicate a material suitable for press bending. An increase in sulfuric acid resistance is also apparent with the treated materials.

Measurement of panels made from enamels containing example material D and control material E demonstrate the utility of the invention. The gloss of the control material increases again with temperature. Likewise, a small upward trend is observed in gloss for Sample D. However, the overall gloss is still reduced by more then 60% over the control.

TABLE II

Formulations of enamels containing example materials.

| Material | Samples* | | | | | |
|---|---|---|---|---|---|---|
|  | A | B | C | D | E | F |
| Flux | 14.4 | 14.4 | 14.4 | 14.4 | 14.4 | 14.4 |
| Example 2 |  | 3.6 |  |  |  |  |
| Example 2 | 3.6 |  |  |  |  |  |
| Example 4 |  |  | 3.6 |  |  |  |
| Example 6 |  |  |  | 3.6 |  |  |
| Example 6 Control |  |  |  |  | 3.6 |  |
| Example 2 and 4 Control |  |  |  |  |  | 3.6 |
| Medium | 5.76 | 5.66 | 5.04 | 5.37 | 4.2 | 4.2 |
| Ratio | 3.73 | 3.91 | 4.29 | 4.16 | 4.29 | 4.29 |

*amounts are in grams

TABLE III

Performance data of a representative application of the invention.

| Material | Samples | | | | | |
|---|---|---|---|---|---|---|
|  | A | B | C | D | E | F |
| Fire 1180° F./6-min | NF* | F | F | F | F | F |
| Gloss 1180° F./6-min | 2.1 | 1.6 | 7 | 4.7 | 16.5 | 21.2 |
| Color 1180° F./6-min L | 6.1 | 5.24 | 7.43 | 6.29 | 3.69 | 4.26 |
| a | 0.33 | 0.35 | 0.06 | −0.42 | 0.04 | 0.34 |
| b | −0.65 | −0.02 | −2.19 | −3.5 | −0.52 | 0.91 |
| 2nd Surface | Black | Black | Black | Black | Black | Black |
| Fire 1200° F./6-min | F | F | F | F | F | F |
| Gloss 1200° F./6-min | 2.2 | 1.8 | 10.4 | 4.3 | 22.7 | 23 |
| Color 1200° F./6-min L | 6.06 | 5.09 | 7.41 | 6.33 | 3.59 | 4.2 |
| a | 0.28 | 0.36 | 0.03 | −0.44 | 0.06 | 0.33 |
| b | −0.41 | 0.07 | −1.95 | −3.41 | −0.48 | 0.97 |
| 2nd Surface | Black | Black | Black | Black | Black | Black |
| Fire 1230° F./6-min | F | F | F | F | F | F |
| Gloss 1230° F./6-min | 2.6 | 2.1 | 13.5 | 9.4 | 27.4 | 26.5 |
| Color 1230° F./6-min L | 8.67 | 6.5 | 10.79 | 6.48 | 4.32 | 4.56 |
| a | 0.05 | 0.45 | −0.83 | −1.34 | −0.12 | 0.79 |
| b | −1.37 | −0.48 | −2.92 | −3.23 | −0.81 | 0.85 |
| 2nd Surface | Black | Black | Grey | Black | Black | Black |
| Citric 15 mins** | 2 | 2 | 2 | 2 | 2 | 2 |
| HCl 5 mins** | 4 | 4 | 3 to 4 | 4 | 4 | 4 |
| Sulfuric Acid 2 hrs** | 3 | 3 | 3 | 4 | 4 | 4 |
| O.D. 1180/6 | 2.6 | 3.2 | 1.9 | 2.8 | 4.8 | 4.9 |

*F = Fired, NF = Not Fired
**Acid resistance scale range 1 = no effect to 7 = complete film removal

What is claimed is:

1. A core-shell composite material comprising an inorganic pigment core particle and a shell of a metal oxide material, wherein said shell completely surrounds said inorganic pigment core particle, and wherein the inorganic pigment is a complex inorganic colored pigment (CICP).

2. The core-shell material according to claim 1 wherein the shell is selected from a single layer, mixed layer materials, and multiple layer materials, said layer comprising a metal oxide selected from oxides of Zn, Al, Zr, Si, Sn, Bi, Na, K, B, and mixtures thereof.

3. The core-shell material according to claim 2 wherein the core particle has a diameter of from about 0.05 μm to about 5.0 μm.

4. The core-shell material according to claim 3 wherein the core particle has a diameter of from about 0.3 μm to about 2 μm.

5. The material according to claim 3 wherein the shell has a thickness of from about 1 nm to about 600 nm.

6. The core-shell material according to claim 1 wherein the shell material is from about 0.2% to about 50% by weight of the core-shell material.

7. The core-shell material according to claim 6 wherein the shell material is from about 3% to about 18% by weight of the core-shell material.

8. The core-shell material according to claim 1 wherein the shell is a layered material in crystalline form.

9. The core-shell material according to claim 1 wherein the shell is a layered material in amorphous form.

10. The core-shell material according to claim 1 wherein the shell material contains up to about 50% of a second material comprising a second metal oxide selected from oxides of Ti, Ni, Zn, Al, Zr, Si, Sn, Bi, Na, K, B, and mixtures thereof.

11. An enamel composition comprising from about 0.2% to about 35% of the core-shell material of claim 1 together with from about 40% to about 80% by weight of glass frit.

12. The enamel composition according to claim 11 which includes an organic vehicle.

13. The core-shell material according to claim 1 wherein the shell material is selected from $Bi_2SiO_5$, $Ni_2SiO_4$, $Zn_2SiO_4$, and mixtures thereof.

14. The core-shell material according to claim 1 wherein the core comprises a copper chrome oxide spinel particle, and shell of single metal oxides selected from $SnO_2$, ZnO, and $SiO_x$, wherein x is any number commonly designated in the class of amorphous silicas.

15. The core-shell material according to claim 1 wherein the shell precipitated onto the core from an aqueous solution of metal salts selected from Ti, Ni, Al, Zr, Zn, Si, Sn, Bi, Na, K, Li and B metal salts.

16. The core-shell material according to claim 15 wherein the precipitate is the result of manipulation of the pH of the solution.

* * * * *

UNITED STATES PATENT AND TRADEMARK OFFICE
CERTIFICATE OF CORRECTION

PATENT NO. : 7,498,081 B2 Page 1 of 1
APPLICATION NO. : 11/361385
DATED : March 3, 2009
INVENTOR(S) : Michael D. Musick et al.

It is certified that error appears in the above-identified patent and that said Letters Patent is hereby corrected as shown below:

On the Title Page, Item (73) Assignee should read
--Assignee:    The Shepherd Color Company
               Cincinnati, OH (US)--.

Signed and Sealed this

Fifth Day of May, 2009

JOHN DOLL
*Acting Director of the United States Patent and Trademark Office*